United States Patent [19]
Ishitoya et al.

[11] Patent Number: 5,804,292
[45] Date of Patent: Sep. 8, 1998

[54] LAMINATED ARTICLES METHOD OF MAKING

[75] Inventors: Katsunori Ishitoya; Hiroyuki Kato; Yukio Ishihara; Kazunori Kuze; Yoshihiko Hiraiwa; Makoto Horiba, all of Aichi-ken, Japan

[73] Assignee: Araco Kabushiki Kaisha, Japan

[21] Appl. No.: 596,232

[22] PCT Filed: Jun. 15, 1995

[86] PCT No.: PCT/JP95/01190

§ 371 Date: Jun. 17, 1996

§ 102(e) Date: Jun. 17, 1996

[87] PCT Pub. No.: WO95/35208

PCT Pub. Date: Dec. 28, 1995

[30] Foreign Application Priority Data

Jun. 17, 1994 [JP] Japan .................................. 6-136072
Jul. 13, 1994 [JP] Japan .................................. 6-161594

[51] Int. Cl.$^6$ ............................. B32B 5/12; B32B 5/06; B31F 1/22; B29B 1/165
[52] U.S. Cl. ...................... 428/304.4; 428/109; 428/234; 428/247; 428/248; 156/148; 156/196; 156/221; 156/242
[58] Field of Search ............................. 428/304.4, 109, 428/234, 247, 248, 255, 300; 156/148, 196, 221, 242, 245, 307 B

[56] References Cited

U.S. PATENT DOCUMENTS 4,986,865  1/1991  Fuji .......................................... 156/214
5,297,842  3/1994  Hayashi ................................. 296/146.7
5,308,570  5/1994  Hara et al. ............................... 264/255
5,401,556  3/1995  Ishitoya et al. ......................... 428/109

FOREIGN PATENT DOCUMENTS 0 590 748A2  7/1990   European Pat. Off. .
56-11223     4/1981   Japan .
63-297039    5/1988   Japan .
2-286315     4/1989   Japan .
2 076 725    12/1981  United Kingdom .

OTHER PUBLICATIONS

Patent Abstracts of Japan, vol. 018, No. 453 (M–1662), 24 Aug. 1994 & JP 06 144123 (Kasai Kogyo Co. Ltd.), 24 May 1994.

*Primary Examiner*—Lynette F. Smith
*Attorney, Agent, or Firm*—Nixon & Vanderhye P.C.

[57] ABSTRACT

The invention provides a laminated article such as a door trim board capable of maintaining a bonding effect for a long period of time by integrally forming a base member and a skin member without forming the skin member in the shape of a sheet and without using an adhesive, and a manufacturing method of the laminated article by which reduction in the quantity of materials to be used and simplification of manufacturing steps are achieved. A porous base member (11) molded in the shape of a door trim board and a molten resin (12melt) supplied on the surface of the porous base member are pressed between a pair of molds (31, 32) so that the molten resin (12melt) is impregnated into the porous base member at least at the front surface thereof and hardened to form a skin member (12) on the porous base member (11). In the door trim board thus obtained, the resin forming the skin member (12) and the porous base member (11) are integrated by an anchor effect of resin with a reliable strength thereof retained.

17 Claims, 7 Drawing Sheets

though the skin member 14 is fully covered on the front surface of the base member 13, the skin

LAMINATED ARTICLES METHOD OF MAKING

FIELD OF THE INVENTION

The present invention relates to a laminated article such as a door trim board or an interior material of an automotive vehicle and a manufacturing method of the laminated article.

BACKGROUND OF THE INVENTION

As a laminated article for the foregoing use, there has been proposed a laminated article which is comprised of a base member of wood or synthetic resin material formed in a predetermined shape and a skin layer of synthetic resin formed on the base member. For example, Japanese Patent Laid-open Publication No. 2-286315 discloses a door trim board the base member of which consists of a wooden hard board formed in a predetermined shape and fully covered with a skin layer adhered to the front surface thereof.

Figure 12:
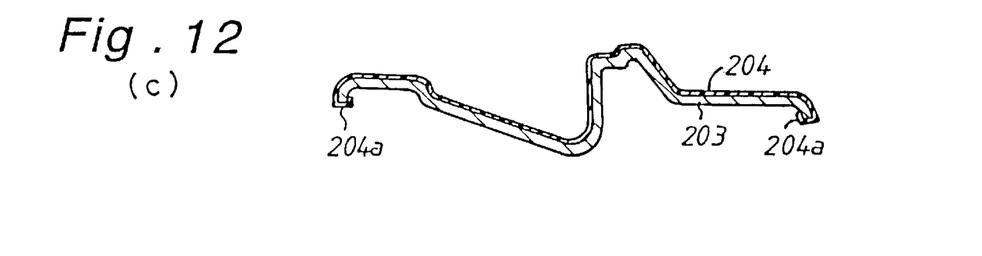
FIG. 12A–12C illustrates manufacturing process of a conventional door trim board.

During manufacturing process of the door trim board, as shown in FIG. 12(a), a base member 203 formed in a predetermined shape and a skin member 204 formed with a design pattern are retained in place under suction along with each molding surface of lower and upper molds 201 and 202 of a vacuum molding machine and integrally adhered by an adhesive under pressure between the molds 201 and 202. After adhered to the base member 203, the skin member 204 is cut in such a manner that an outer periphery of skin member 204 is protruded out of the base member 203 as shown in FIG. 12(b). The protruded portion 204a of the skin member 204 is rolled inwardly as shown in FIG. 12(c) and adhered to the outer periphery of the base member 203 for the beauty of the door trim board.

Since in the conventional door trim board, an adhesive is used to adhere the base member 203 and skin member 204, the adhered portion is comprised of three layers such as the base member 203, skin member 204 and adhesive layer. In use of the door trim board for a long period of time, there will occur strain in the adhered portion, particularly in the adhesive layer due to a difference in physical-chemical properties such as thermal expansion coefficients of the three layers. This causes separation of the skin member 204 from the base member 203. In the door trim board produced by the conventional manufacturing method, the component layers may not be sufficiently adhered due to irregularity in coating of the adhesive at the manufacturing process. In the conventional manufacturing method, it is required to provide means or process for coating the base member 203 and skin member 204 with the adhesive, and it is further required to form the skin member 204 in the shape of a sheet to be adhered to the base member 203. As a result, the manufacturing apparatus and process are complicated.

DISCLOSURE OF THE INVENTION

The present invention is directed to solve the problems described above. Thus, an object of the present invention is to provide a laminated article such as a door trim board capable of maintaining a bonding effect of the components for a long period of time by integrally forming a base member and a skin member without forming the skin member in the shape of a sheet and without using any adhesive and to provide a manufacturing method of the laminated article by which reduction in the quantity of materials to be used and simplification of the manufacturing steps are achieved.

According to the present invention, the object is accomplished by providing a laminated article comprised of a porous base member formed in a predetermined shape and covered with a skin member of resin material which is hardened in a condition where it was impregnated into the porous base member at least at the front surface thereof.

According to an aspect, there is provided a manufacturing method of the laminated article wherein a porous base member formed in a predetermined shape and an amount of resin melt supplied onto the front surface of the porous base member are pressed between a pair of molds so that the resin melt is impregnated into the porous base member at least at the front surface thereof and hardened to integrally form a skin member on the porous base member.

The manufacturing method of the laminated article comprises steps of setting a porous base member formed in a predetermined shape between a pair of molds, injecting an amount of resin melt onto the front surface of the porous base member between the molds to impregnate the resin melt into the porous base member at least at the front surface thereof, and hardening the injected resin melt to integrally form a skin member on the porous base member.

To enhance wetness of the porous base member to the resin melt in the manufacturing method, the front surface of the porous base member may be treated by a surface reforming agent prior to impregnation of the resin melt. The porous base member used in the present invention may be in the form of a molded member of resin or wood material. Preferably, the laminated article is used as a door trim board or an interior material of an automotive vehicle.

Since in the laminated article comprised as described above, the resin melt for the skin member is hardened after directly impregnated into at least the front surface of the porous base member, the integrated portion of the skin member and the porous base member is comprised of only two materials integrated by an anchor effect of resin. As a result, any strain does not occur in the integrated portion as in the laminated layers adhered by a conventional manner. Accordingly, even if the laminated article was used for a long period of time, the skin member would not separate from the porous base member. Since the laminated article is manufactured without using any adhesive, an incompletely bonded portion caused by irregularity in coating of the adhesive does not occur.

The laminated article can be manufactured in a simple manner by pressing the porous base member and the thermoplastic resin melt for the skin member between the pair of molds and hardening the thermoplastic resin melt impregnated into the front surface of the porous base member. The laminated article can be also manufactured in a simple manner by injecting an amount of thermoplastic resin melt onto the front surface of the porous base member placed between the pair of molds and hardening the thermoplastic resin melt impregnated into the front surface of the porous base member. With such a manufacturing method of the laminated article according to the present invention, the manufacturing process can be simplified without coating process of an adhesive and forming process of the skin member in the conventional manufacturing method.

In the case that wetness of the thermoplastic resin melt to the porous base member is poor in the manufacturing process, wetness of the thermoplastic resin melt can be enhanced by treating the front surface of the porous base member with a surface reforming agent prior to impregnation of the thermoplastic resin melt.

DESCRIPTION OF THE PREFERRED EMBODIMENTS

Figure 1:
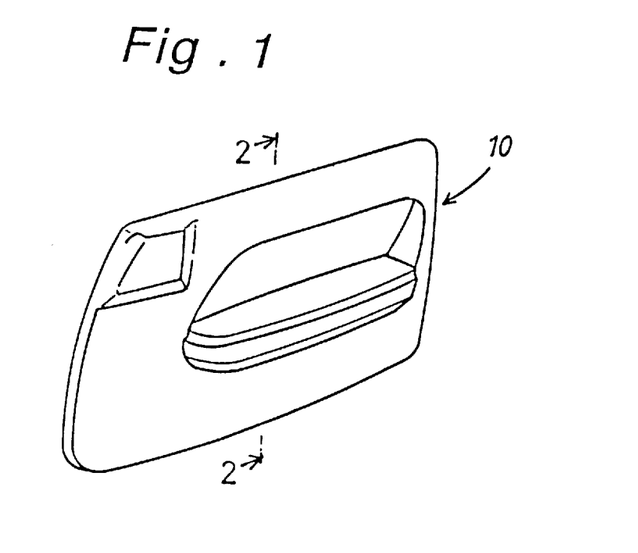
FIG. 1 is a perspective view of a door trim board in accordance with the present invention.
Figure 2:
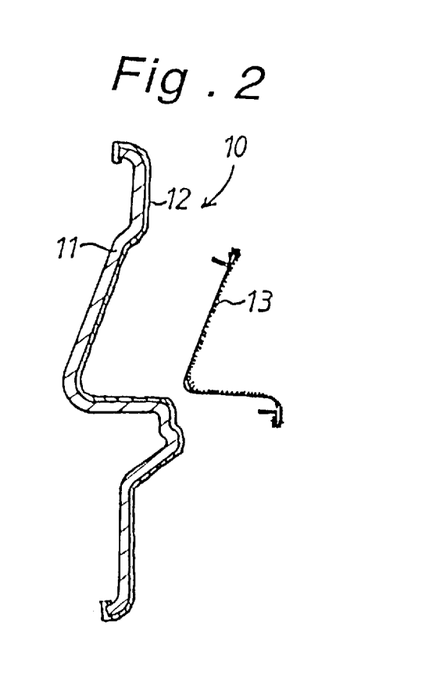
FIG. 2 is a vertical sectional view taken along line 2—2 in FIG. 1.

Hereinafter, a door trim board of an automotive vehicle in accordance with present invention and a manufacturing method of the door trim board will be described with reference to the drawings. As shown in FIGS. 1 and 2, the door trim board 10 is comprised of a porous base member 11 formed in the shape of a door trim and a skin member 12 formed on the porous base member 11. The skin member 12 is provided with a design pattern 13 for decoration, in necessity. The base member 11 is in the form of a porous member which is formed by a mixture of wood fiber and a bonding agent such as phenol resin mixed at a ratio of 93:7. The skin member 12 is made of a thermoplastic resin such as polypropylene. The porous base member 11 and skin member 12 are integrated by an anchor effect of resin at a portion where the thermoplastic resin melt of the skin member 12 is hardened in a condition where the resin melt was impregnated into internal pores in the porous base member 11.

Since in the door trim board 10, the bonded portion of the porous base member and skin member 12 is comprised of only two materials integrated by an anchor effect of resin, any stress does not occur at the integrated portion. Accordingly, even if the laminated article in the form of the door trim board was used for a long period of time. separation of the skin member 12 from the porous base member would not occur. Since the laminated article is manufactured without using any adhesive, there will not occur an incompletely bonded portion caused by irregularity in coating of the adhesive during the manufacturing process.

Figure 3:
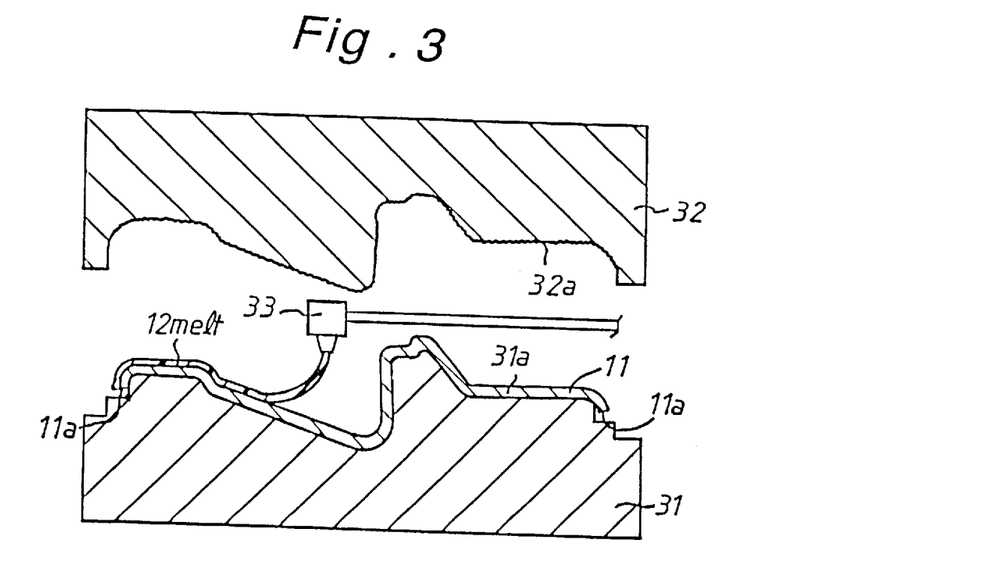
FIG. 3 illustrates a first embodiment of the manufacturing method of the door trim board.

Hereinafter, a manufacturing method of the door trim board will be described with reference to the drawings. In FIG. 3. there is illustrated a first embodiment of the manufacturing method of the door trim board 10 shown in FIGS. 1 and 2. In the manufacturing method of this embodiment, a lower mold 31 formed with a molding surface 31a forming the back surface of the trim board, an upper mold formed with a molding surface 32a having embossed ornaments forming a design pattern on the front surface of the skin member and an injection device 33 for injecting of a thermoplastic resin melt are used.

During the manufacturing process, the lower and upper molds 31 and 32 are preheated at 20°–30° C., and a porous base member 11 formed in the door trim is set on the molding surface 31a of lower mold 31a at a temperature of 20°–60° C. Thereafter, an amount of polypropylene resin 12melt in a molten state (at 180°–220° C.) is supplied by the injection device 33 onto the front surface of the porous base member 11 at a discharge amount of about 1500 g/min. within about 12 minutes per one sheet. In this instance, the polypropylene resin 12melt is supplied onto the front surface of the porous base member 11 in such a manner that the thickness of polypropylene resin melt becomes larger in 0.1 mm than that of the trim board and that the supply width of polypropylene resin melt becomes 0.95 times the width of the trim board. Subsequently, in a condition where the temperature of polypropylene resin 12melt is maintained at 140°–160° C., the polypropylene resin 12melt is spread out under pressure more than 30 kgf/cm$^2$ between the upper and lower molds 32 and 31 within 2–3 seconds and impregnates into internal pores in the porous base member 11 at its front surface side. When the polypropylene resin 12melt is cooled for about 30 seconds under pressure more than 30 kgf/cm$^2$ and hardened, the front surface of the porous base member 11 is fully covered with a skin member 12 formed by the polypropylene resin to produce the door trim board 10.

Figure 4:
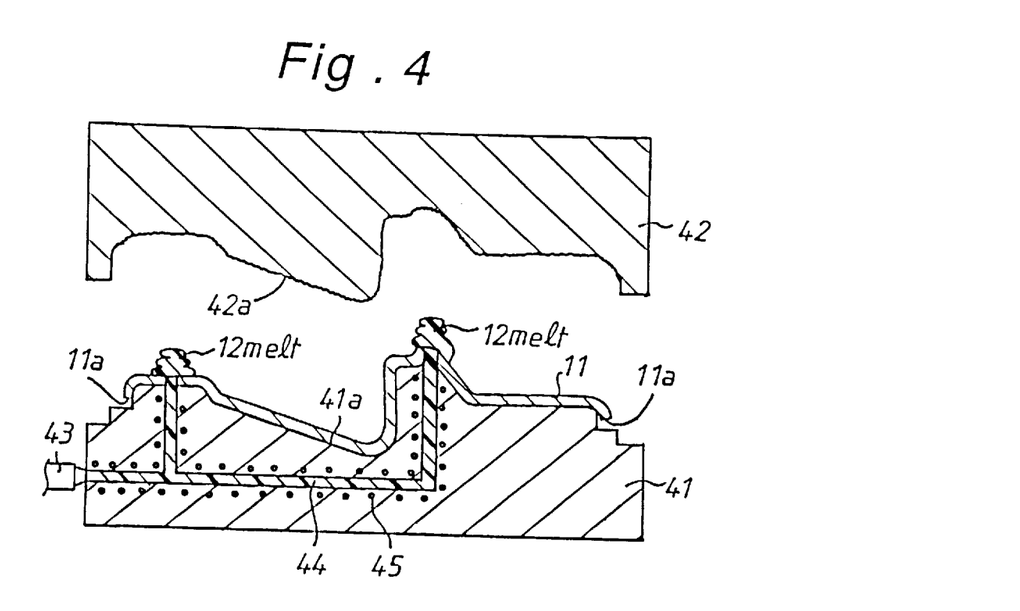
FIG. 4 illustrates a second embodiment of the manufacturing method of the door trim board.

Illustrated in FIG. 4 is a second embodiment of the manufacturing method of the door trim board 10 shown in FIGS. 1 and 2. In the manufacturing method of this embodiment, an upper mold 42 formed with a molding surface 42a forming the front surface of the trim board and a lower mold 41 formed with a molding surface 41a forming the back surface of the trim board are used. The lower mold 41 is formed with resin supply passages 44 opening toward the molding surface 41a at appropriately distributed positions and provided with a heater 45 to prevent fall of the temperature of polypropylene resin 12melt being supplied into the passages 44. During the manufacturing process, a molten polypropylene resin 12melt is injected by an injection device 43 into the resin supply passages 44 and supplied onto the front surface of the porous base member 11.

Figure 5:
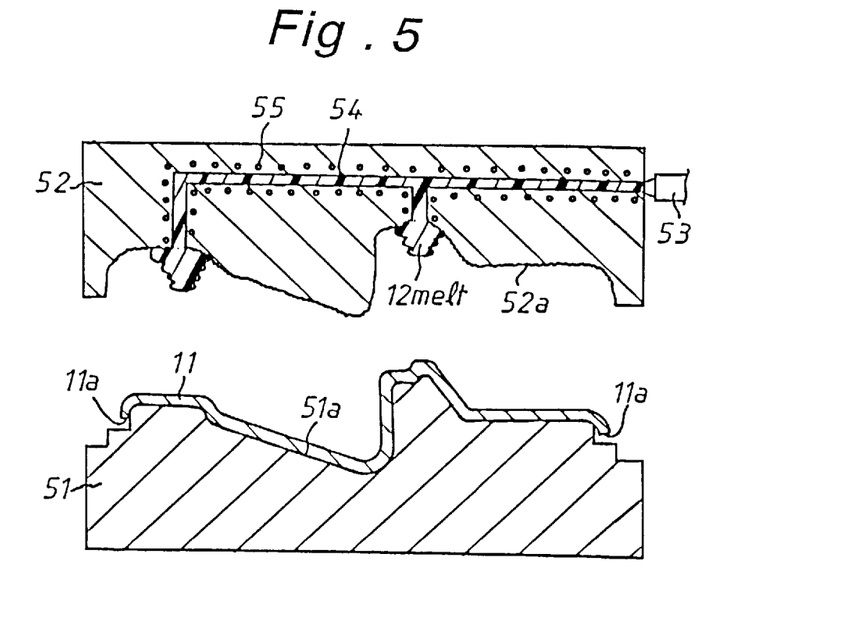
FIG. 5 illustrates a third embodiment of the manufacturing method of the door trim board.

Illustrated in FIG. 5 is a third embodiment of the manufacturing method of the door trim board 10 shown in FIGS. 1 and 2, in the manufacturing method of this embodiment, an upper mold 52 formed with a molding surface 52a forming the front surface of the trim board and a lower mold 51 formed with a molding surface 51a forming the back surface of the trim board are used. The upper mold 52 is formed with resin supply passages 54 which are opened toward the molding surface 52a at appropriately distributed positions and provided with a heater 55 to prevent fall of the temperature of polypropylene resin 12melt being supplied into the passages 54. During the manufacturing process, a molten polypropylene resin 12melt is injected by an injection device 53 into the resin supply passages 54 and supplied onto the front surface of the porous base member 11.

Figure 6:
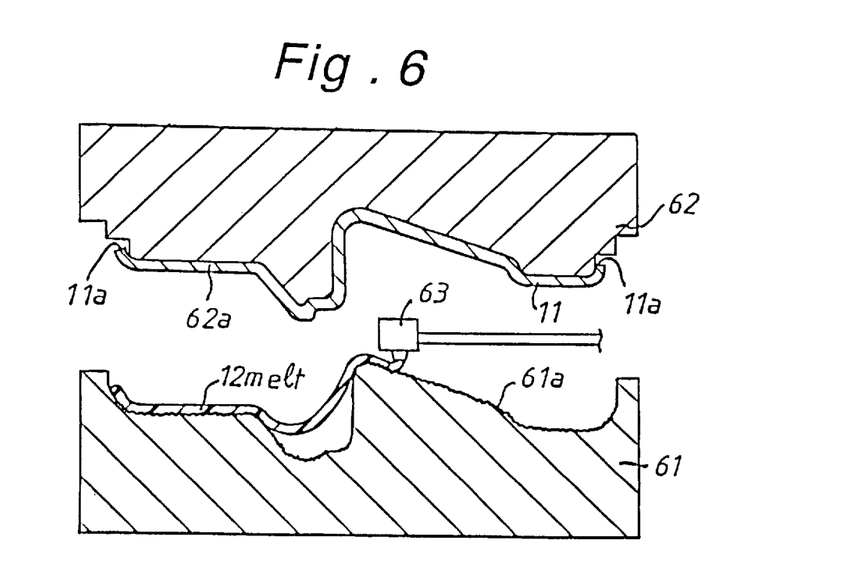
FIG. 6 illustrates a fourth embodiment of the manufacturing method of the door trim board.

Illustrated in FIG. 6 is a fourth embodiment of the manufacturing method of the door trim board 10 shown in FIGS. 1 and 2. In a pair of molds 61 and 62 used in this embodiment, the lower mold 61 is formed with a molding surface 61a forming the front surface of the trim board, while the upper mold 62 is formed with a molding surface 62a forming the back surface of the trim board. In addition, the molding surface 61a of lower mold 61 is formed with embossed ornaments forming a design pattern on the front surface of the skin member.

During the manufacturing process of the door trim board 10, the upper and lower molds 61 and 62 are preheated at 20°–30° C., and an amount of polypropylene resin 12melt in a molten state (at 180°–220° C.) is supplied by an injection device 63 on the molding surface 61a of lower mold 61 at a discharge amount of 1500 g/min. within 12 seconds per one sheet while a porous base member 11 of wood material formed in the shape of the door trim board is set on the molding surface 62a of upper mold 62 at 20°–60° C. Thereafter, the upper mold 62 is lowered to press the porous base member 11 and polypropylene resin 12melt under pressure more than 30 kgf/cm$^2$ for 2–3 seconds thereby to impregnate the resin 12melt into internal pores in the front surface of the porous base member 11. When the resin 12melt is cooled under pressure of 30 kgf/cm$^2$ for 30 seconds and hardened, the front surface of the porous base member 11 is fully covered with a skin member 12 formed by the resin 12melt to produce the door trim board 10.

Figure 7:
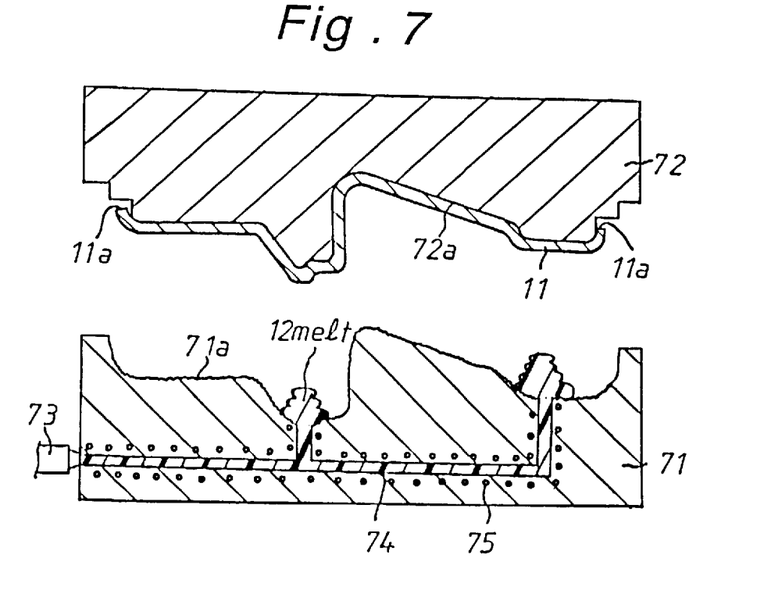
FIG. 7 illustrates a fifth embodiment of the manufacturing method of the door trim board.

Illustrated in FIG. 7 is a fifth embodiment of the manufacturing method of the door trim board according to the present invention, wherein a lower mold 71 formed with a molding surface 71a forming the front surface of the trim board and an upper mold 72 formed with a molding surface 72a forming the back surface of the trim board are used. This embodiment is different from the fourth embodiment only in the facts that the lower mold 71 is formed with resin supply passages 74 opening into the molding surface 71a at appropriately distributed positions and provided with a heater 75 to prevent fall of the temperature of resin 12melt supplied into the passages 74 and that the resin 12melt is injected by an injection device 73 into the passages 74 and supplied onto the front surface of the porous base member 11 through the passages 74.

Figure 8:
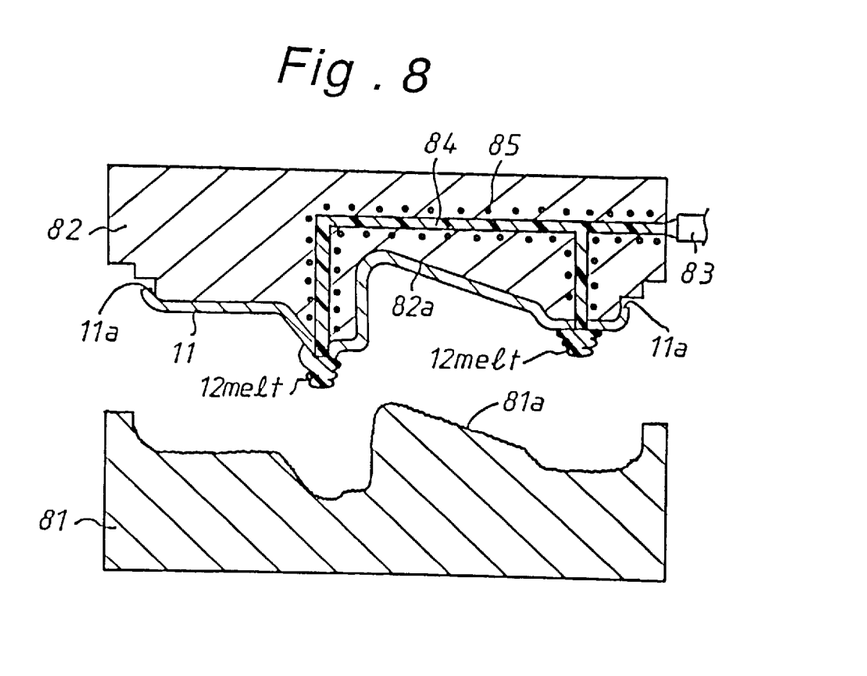
FIG. 8 illustrates a sixth embodiment of the manufacturing method of the door trim board.

Illustrated in FIG. 8 is a sixth embodiment of the manufacturing method of the door trim board according to the present invention, wherein a lower mold 81 formed with a molding surface 81a forming the front surface of the trim board and an upper mold 82 formed with a molding surface 82a forming the back surface of the trim board are used. This embodiment is different from the fourth embodiment only in the facts that the upper mold 82 is formed with resin supply passages 84 opening into the molding surface 82a at appropriately distributed positions and provided with a heater to prevent fall of the temperature of molten polypropylene resin 12melt supplied into the passages 84 and that the molten polypropylene resin 12melt is injected by an injection device 83 into the resin supply passages 84 and supplied onto the front surface of the porous base member 11 through the resin supply passages 84.

Figure 9:
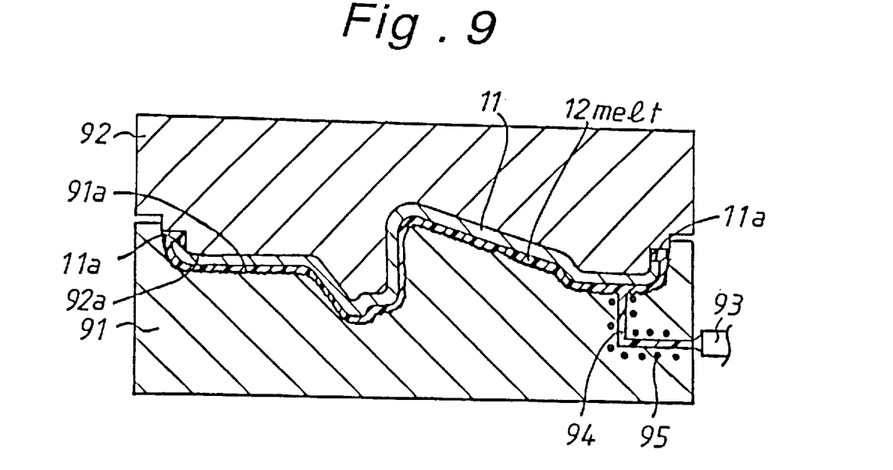
FIG. 9 illustrates a seventh embodiment of the manufacturing method of the door trim board.

Illustrated in FIG. 9 is a seventh embodiment of the manufacturing method of the door trim board shown in FIG. 1 and 2. In the manufacturing method of this embodiment, a porous base member 11 is first set between a pair of molds 91 and 2. Subsequently, polypropylene resin 12melt in a molten state (at 180°–220° C.) is injected by an injection device 93 into a resin supply passage 94 under high pressure of 100–300 kg/cm$^2$ and supplied between the front surface of the porous base member 11 and a molding surface 91a of lower mold 91 so that the resin 12melt is impregnated into pores in the front surface of the porous base member 11. When the resin 12melt is hardened, the front surface of the porous base member 11 is fully covered with a skin layer 12 formed by the resin 12melt to produce the door trim board 10. The lower mold 91 is provided therein with a heater 95 to prevent fall of the temperature of resin 12melt supplied into the resin supply passage 94. In the case that the opening position of resin supply passage 94 is located at a portion where a distal end of the trim board is formed or an ornament is attached thereto, the design of the door trim board would not be spoiled even if burrs were formed at the opening position of the resin supply passage.

Figure 10:
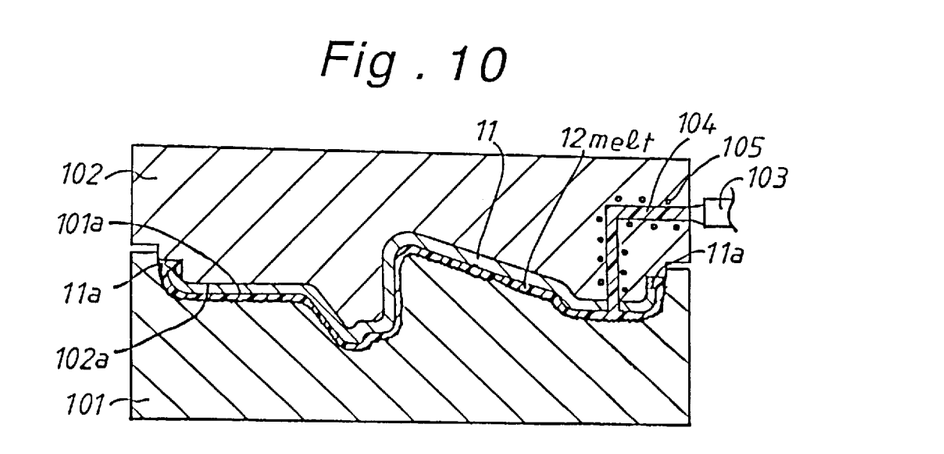
FIG. 10 illustrates a eighth embodiment of the manufacturing method of the door trim board.

Illustrated in FIG. 10 is an eighth embodiment of the manufacturing method of the door trim board 10 shown in FIGS. 1 and 2, wherein a lower mold 101 formed with a molding surface 101a forming the front surface of the trim board and an upper mold 102 formed with a molding surface 102a forming the back surface of the trim board are used. This embodiment is different from the seventh embodiment only in the facts that the upper mold 102 is formed with resin supply passages 104 opening toward the molding surface 102a at appropriately distributed positions and provided with a heater 105 to prevent fall of the temperature of resin 12melt being supplied into the passages 104 and that the resin 12melt is injected by an injection device 103 into the resin supply passages 104 and supplied onto the front surface of the porous base member 11.

With the manufacturing methods of the foregoing embodiments, the manufacturing process can be simplified without coating process of an adhesive and forming process of a skin member required in a conventional manufacturing method. In addition, the materials used for production of the door trim board can be reduced since any adhesive is not used.

As shown in the drawings, each molding surface 32a, 42a, 52a, 61a, 71a, 81a, 91a, 101a forming the front surface of the trim board is embossed for forming a design pattern on the skin member 12 at the time when the porous base member 11 was covered with the skin member 12. In each pair of the molds 31, 32; 41, 42; 51, 52; 61, 62; 71, 72; 81, 82; 91, 92; 101, 102; the molding surfaces 31a, 32a; 41a, 42a; 51a, 52a: 61a, 62a: 71a, 72a; 81a, 82a; 91a, 92a; 101a, 102a each are formed to supply the resin 12melt into a cavity clearance formed between the outer peripheral edge 11a and the corresponding molding surface. It is, therefore, able to fully cover the outer peripheral edge 11a of the porous base member 11 with the resin melt. As a result, the outer peripheral edge of the door trim board 10 can be treated without cutting process of the skin member (see FIG. 12(b)) and rolling process of the protruded portion of the skin member (see FIG. 12(c)) required in the conventional manufacturing method and can be completed without any spoil of the beauty.

Although in the embodiments described above, a mixture of wood fiber and phenol resin mixed at a ratio of 93:7 was used as a raw material of the porous base member, a mixture of 80% wood fiber, 10% phenol resin and 10% olefinic fiber may be used as a raw material of the porous base member. Alternatively, a porous member made of hard foamable polyurethane resin may be used as the porous base member. Furthermore, a molded porous member made of a thermoplastic resin such as phenol resin, epoxy resin, polyester resin, etc. or polypropylene resin, ABS resin, etc. added with a reinforcing agent and an antistatic agent, a molded porous member made of pressed metal fibers, a molded member of carbon material, or a porous member comprised of porous resin laminated on an unwoven fabric may be used as the porous base member. For example, a mixture of polypropylene resin or polyethylene resin mixed with 10–30% magnesium silicate, glass fiber or calcium carbonate may be used as a raw material of the porous base member. In the case that wetness of the base member made of the foregoing materials to the skin member is poor, a surface reforming agent such as olefine may be coated on or impregnated into the front surface of the porous base member to enhance permeability of the resin melt into pores in the porous base member. For example, in the case that the base member is made of polypropylene resin while the skin member is made of vinyl chloride resin, a polyolefine chloride based primer is used as the surface reforming agent.

Although in the above embodiments polypropylene resin was used to form the skin member, ethylene propylene elastomers may be mixed with the polypropylene resin at a ratio of 10–50%, preferably 40% to adjust fluidity and hardness of the resin melt. In the following table, the fluidity and hardness of the resin melt are evaluated in relation to the mixing ratio of polypropylene resin and ethylene propylene elastomers.

TABLE

| Property | No | | | |
|---|---|---|---|---|
| | 1 | 2 | 3 | 4 |
| Fluidity | x | Δ | ○ | ○ |
| MFR | 1 | 80 | 169 | 155 |
| Hardness | x | Δ | x | ○ |
| Shore A | 92 | 87 | 89 | 73 |

MFR (Melt Flow Ratio): Fluidity by JIS K 6760
Unit: g/min.
Shore A: Hardness measured by a hardess tester
Unit: Hs
No. 1: polypropylene:ethylene propylene elastomers = 90:10
No. 2: polypropylene:ethylene propylene elastomers = 80:20
No. 3: polypropylene:ethylene propylene elastomers = 50:50
No. 4: polypropylene:ethylene propylene elastomers = 60:40

As the material of the skin member, another olefinic thermoplastic resin such as vinyl chloride, polyethylene, ethylene-propylene polymer, ethylene-vinyl acetate polymer, ethylene-acrylic acid polymer, acrylonitrile-butadienestyrene polymer (ABS resin), polyamide resin, ASA resin, etc. or a mixture of two kinds of the thermoplastic resins may be used. The material of the skin member may be also added with a brightener and a nonflammable agent taking into account appearance and property of the product.

Although the foregoing molds 31, 32: 41, 42: 51, 52: 61, 62: 71, 72: 81, 82: 91, 92: 101, 102 were made of aluminum, the molds may be made of iron, ZAS (Trade name of zinc alloy manufactured by Sumitomo Kinzoku Kogyo K.K) or resin.

Figure 11:
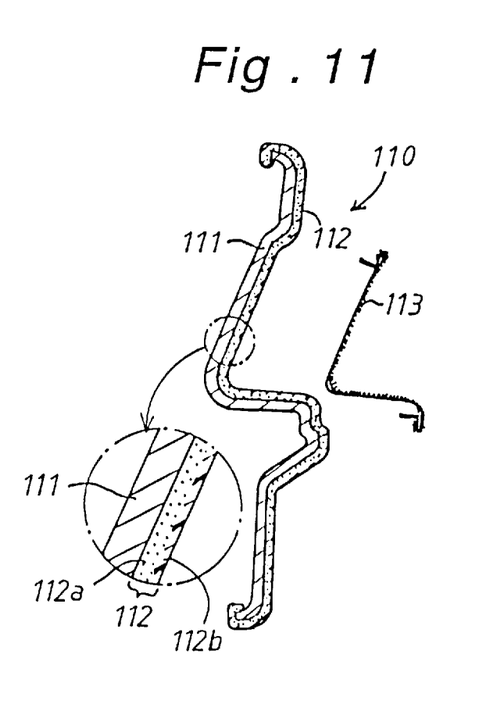
FIG. 11 is a vertical sectional view of a door trim broad produced by manufacturing methods A and B in accordance with the present invention.

Although in the above embodiments, the door trim board shown in FIGS. 1 and 2 was manufactured by hardening the polypropylene resin melt spread out on the front surface of the porous base member placed between the pair of molds, a portion of the skin member may be foamed to produce a door trim board 110 the skin layer of which is soften as shown in FIG. 11. The door trim board 110 is comprised of a porous base member 111 made of wood or resin material and a skin member integrally formed on the porous base member 111. The skin member 112 is decorated by a design pattern 113 partly formed thereon as in the door trim board shown in FIG. 2. The skin member 112 consists of a foamed layer 112a formed by foaming a thermoplastic resin such as polypropylene and hardening the same and a skin layer 112b formed by hardening the thermoplastic resin without foaming the same. The integrated portion of the porous base member 111 and the skin member 112 is in a condition where the thermoplastic resin of the skin member 12 is hardened after impregnated into the internal pores in the porous base member 111. That is to say, the porous base member 111 and skin member 112 are integrated to each other by an anchor effect of resin.

The manufacturing method of the door trim board described above is different from the manufacturing methods of the first to eighth embodiments only in the facts that the foamable thermoplastic resin is used as the material for the skin member 112 and that the foamed layer 112a and skin layer 112b are formed by process for separating the molds in a predetermined clearance after the foamable thermoplastic resin melt is spread out on the front surface of the porous base member 111 between the molds. As an example of the manufacturing method of the door trim board shown in FIG. 11, a manufacturing method A corresponding with the first embodiment shown in FIG. 3 and a manufacturing method B corresponding with the seventh embodiment shown in FIG. 9 will be described below.

In the manufacturing method A, the molds 31, 32 and injection device 33 shown in FIG. 3 can be used. In the following description, the same molds and injection device as those shown in FIG. 3 are designated by the same reference numerals. During the manufacturing process of the door trim board 111, the molds 31, 32 are preheated at 50°–80° C., and a porous base member 111 of wood material formed in the shape of the trim board is placed on the molding surface 31a of lower mold 31. In such a condition, a molten polypropylene resin 112melt mixed with inert gas (for instance, nitrogen gas) at 180°–220° C. is supplied on the surface of the porous base member 111 by means of the injection device 33. (The resin 112melt in the manufacturing process corresponds with the resin 12melt shown in FIG. 3.) Subsequently, the resin 12melt is pressed between the molds 31 and 32 and spread out in a cavity clearance of about 1 mm formed between the porous base member 111 and the molding surface of the upper mold 32. When the cavity clearance between the molds 31 and 32 is widened by about 1 mm after maintained in the above condition for about one second, the resin 112melt in contact with the molding surface 32a of upper mold 32 is formed with the design pattern and hardened at a high cooling speed to form the skin layer 112b, while the resin 112melt adjacent to the porous base member 111 is foamed and hardened at a low cooling speed to form the foamed layer 112a. (see FIG. 11) The resin 112melt impregnated into the internal pores in the porous base member 111 is hardened as it is, and the front surface of the porous base member 111 is fully covered with the skin layer 112 to produce the door trim board 110.

In the manufacturing method B, the molds 91, 92 and injection device 93 shown in FIG. 9 can be used. In the following description, the same molds and injection device as those shown in FIG. 9 are designated by the same reference numerals. During the manufacturing process of the door trim board 111, a porous base member 111 of wood material formed in the shape of the trim board is placed between the molding surfaces 91a, 92a of molds 91, 92 in a condition where a cavity clearance of about 1 mm is being formed between the front surface of the porous base member 111 and the molding surface 91a of lower mold 91. Subsequently, a molten polypropylene resin 112melt mixed with nitrogen gas at 180°–220° C. is injected under high pressure (100–300 kg/cm² by the injection device 93 into the resin supply passage 94 and supplied into the cavity clearance between the front surface of the porous base member 111 and the molding surface 91a of lower mold 91. (The resin 112melt in the manufacturing process corresponds with the resin 12melt shown in FIG. 7) Thus, the resin 112melt is spread out on the front surface of the porous base member 111. When the cavity clearance between the molds 91 and 92 is widened by about 1 mm in such a condition as described above, the resin 112melt in contact with the molding surface 91a of lower mold 91 is formed with the design pattern and hardened at a high cooling speed to form the skin layer 112b, while the resin 112melt adjacent to the base member 111 is foamed and hardened at a low cooling speed to form the foamed layer 112a. (see FIG. 11) The resin 112melt impregnated into the internal pores in the porous base member 111 is hardened as it is, and the front surface of the porous base member 111 is fully covered with the skin layer 112 to produce the door trim board 110.

In the manufacturing methods A and B described above, the manufacturing process of the door trim board can be simplified without process for forming a skin sheet and a foamed sheet required in the conventional manufacturing method. Since the foamed layer 112a and skin layer 112b are integrally formed without adhesion thereof to form the skin member 112, separation of the layers 112a and 112b does not occur. In addition, the thickness and porosity of the foamed layer 112a can be uniformed, and the surface of the skin layer 112b can be uniformly formed along with the molding surface. This is useful to provide a laminated article excellent in uniform elasticity and feel and appearance.

What is claimed is:

1. A method of manufacturing a laminated article, comprising the steps of:

placing a porous base member formed in a predetermined shape between a pair of preheated molds;

injecting an amount of molten thermoplastic resin onto a front surface of the porous base member between the preheated molds;

pressing the molds together so as to spread out the injected molten thermoplastic resin on the front surface of the porous base member under pressure and cause the molten thermoplastic resin to be impregnated into the porous base member at the front surface thereof; and cooling the thermoplastic resin melt impregnated in the front surface of the porous base member to integrally form a skin layer on the porous base member.

2. A method of manufacturing a laminated article as set forth in claim 1, wherein, prior to said injecting step, there is practiced treating the front surface of the porous base member with a surface reforming agent to enhance permeability of the molten thermoplastic resin into pores of the porous base member.

3. A method of manufacturing a laminated article as set forth in claim 1, wherein the porous base member is made of a mixture of wood fiber and phenol resin.

4. A method of manufacturing a laminated article as set forth in claim 1, wherein the laminated article is in the form of a door trim board or an interior material of an automotive vehicle.

5. A method of manufacturing a laminated article as set forth in claim 2, wherein the reforming agent is an olefin.

6. A method of manufacturing a laminated article as set forth in claim 1, wherein the thermoplastic resin melt is a polypropylene resin.

7. A method of manufacturing a laminated article as set forth in claim 1, wherein the thermoplastic resin melt is a mixture of a polypropylene resin and an ethylene propylene elastomer.

8. A method of manufacturing a laminated article, comprising the steps of:

retaining a porous base member formed in a predetermined shape in place on a molding surface of a lower mold;

injecting an amount of molten thermoplastic resin melt onto a front surface of the porous base member in a condition where the lower mold has been preliminarily heated;

lowering a preheated upper mold toward the lower mold to press the injected thermoplastic resin melt and the porous base member on the lower mold so that the thermoplastic resin melt is spread out on the porous base member and impregnated in the porous base member at the front surface thereof; and cooling the thermoplastic resin melt impregnated in the front surface of the porous base member to integrally form a skin layer on the porous base member.

9. A method of manufacturing a laminated article, comprising the steps of:

injecting an amount of molten thermoplastic resin melt onto a molding surface of a preheated lower mold forming a front surface of the laminated article;

placing a porous base member formed in a predetermined shape on a molding surface of a preheated upper mold forming a back surface of the laminated article;

closing the upper and lower molds to press the porous base member and the thermoplastic resin melt so that the thermoplastic resin melt is spread out on the molding surface of the lower mold and is impregnated into the porous base member at the front surface thereof: and cooling the thermoplastic resin melt spread out on the molding surface of the lower mold to integrally form a skin layer on the front surface of the porous base member.

10. A method of manufacturing a laminated article, comprising the steps of:

placing a porous base member formed in a predetermined shape between a pair of molds in such a manner as to form a mold cavity between a front surface of the porous base member and a molding surface of either one of the molds;

preheating the molds to a predetermined elevated temperature;

injecting an amount of molten thermoplastic resin melt into the mold cavity so that the thermoplastic resin melt is spread out on the molding surface of either one of the molds and is impregnated into the porous base member at the front surface thereof; and cooling the molds to harden the thermoplastic resin impregnated in the porous base member thereby to integrally form a skin layer on the front surface of the porous base member.

11. A method of making a laminated shaped structure comprising:

(a) placing a back surface of a preshaped porous base member into a mold cavity defined between a pair mold parts such that the back surface of the preshaped porous base member is opposed to one conformably shaped mold surface defined by a first mold part and a front surface of the preshaped porous base member is opposed to another conformably shaped mold surface of a second mold part;

(b) injecting a melt of a thermoplastic resin into the mold cavity between the front surface of the preshaped porous base member and said another conformably shaped mold surface of said second mold part;

(c) closing the pair of mold parts to apply a pressure to the melt of thermoplastic resin and thereby cause the melt to spread over the front surface of the preshaped porous base member and to be impregnated therewithin; and (d) cooling the melt of thermoplastic resin under pressure applied according to step (c) to form a shaped laminated structure having a solidified layer of said thermoplastic resin integrally anchored, and conformably shaped, to said preshaped base member.

12. A method as in claim 11, wherein step (b) includes injecting the melt of thermoplastic resin directly onto the front surface of the preshaped porous base member.

13. A method as in claim 11, wherein step (b) includes injecting the melt of thermoplastic resin through the preshaped porous base member so as to deposit the melt of thermoplastic resin onto the front surface of the base member.

14. A method as in claim 11, wherein step (b) includes injecting the melt of thermoplastic resin onto said another conformably shaped mold surface of said second mole part.

15. A method as in claim 11, which includes prior to step (b) the step of preheating the pair of mold parts.

16. A method as in claim 15, wherein the pair of mold parts are preheated to a temperature between 20°–30° C.

17. A method as in claim 11, wherein step (c) is practiced so as to exert a pressure of more than 30 kgf/cm² to the melt of thermoplastic resin.

* * * * *